R. A. GATICA.
MACHINE FOR DIVIDING AND CORING FRUIT.
APPLICATION FILED MAY 28, 1918.

1,294,336.

Patented Feb. 11, 1919.
2 SHEETS—SHEET 1.

INVENTOR
RAFAEL AVARIA GATICA,
BY
George F. Beall
ATTORNEY

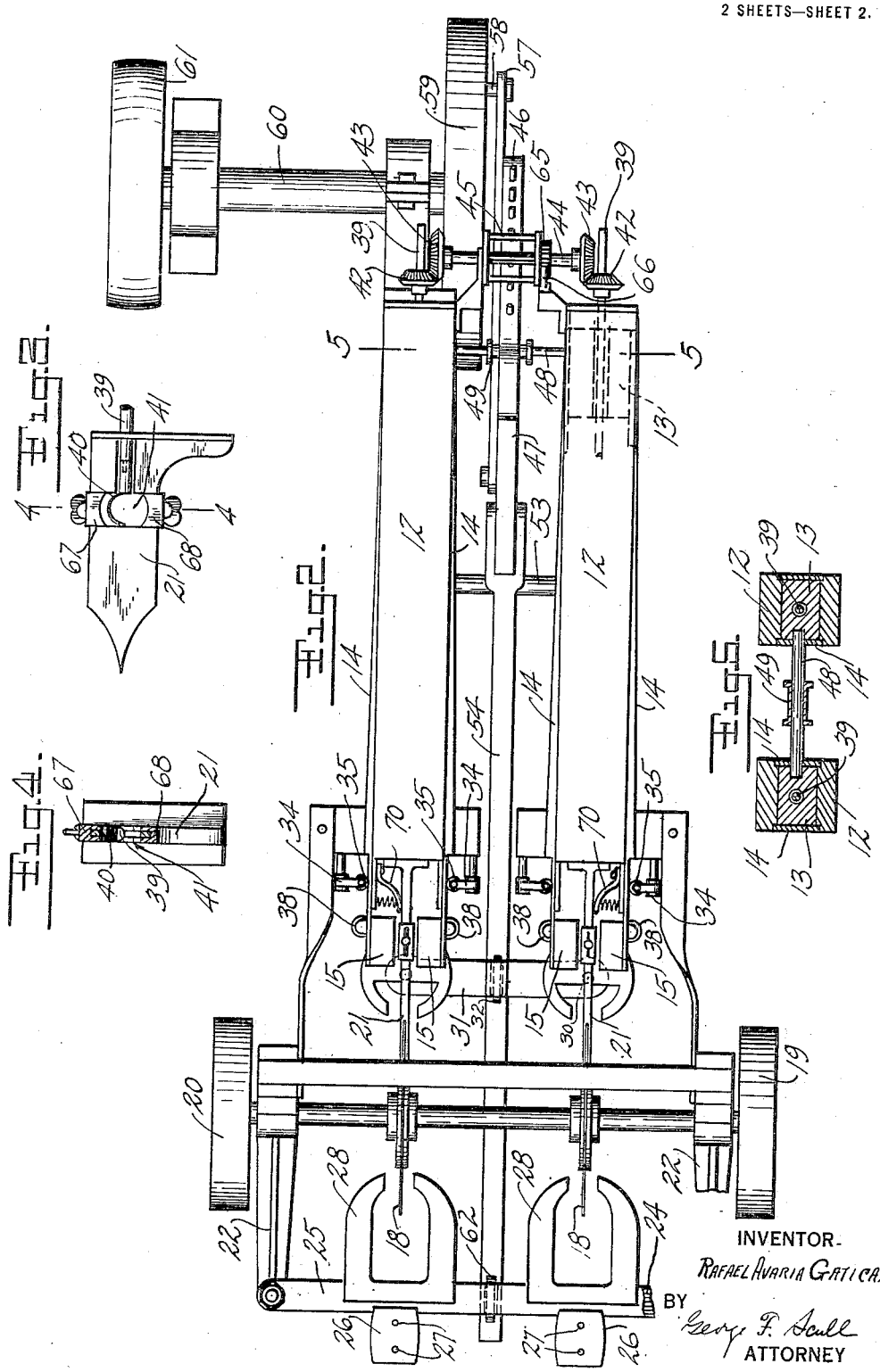

UNITED STATES PATENT OFFICE.

RAFAEL AVARIA GATICA, OF RANCAGUA, CHILE.

MACHINE FOR DIVIDING AND CORING FRUIT.

1,294,336.

Specification of Letters Patent. Patented Feb. 11, 1919.

Application filed May 28, 1918. Serial No. 237,109.

*To all whom it may concern:*

Be it known that I, RAFAEL AVARIA GATICA, a citizen of the Republic of Chile, and a resident of Rancagua, Chile, have invented certain new and useful Improvements in Machines for Dividing and Coring Fruit, of which the following is a specification.

My present invention relates to machines for dividing or splitting the fruit into equal parts, and at the same time, extracting from the same the kernel, stone or core. The machine is intended to operate on such fruits as pears, apples, quinces, peaches, apricots and the like.

One of the objects of my invention is to provide a simple and efficient machine by which the fruits may be automatically divided and the kernel or the like removed.

With this and other objects in view, my invention consists of certain novel features of construction, combination and arrangement of parts as will be more fully described and pointed out in the appended claims.

In the drawings, Figure 1 is a side elevation of an illustrative form of my invention;

Fig. 2 is a plan view of the same;

Fig. 3 is a side elevation on a larger scale of my diamond point knife with the coring knife in place;

Fig. 4 is a section of Fig. 3 on the line 4—4;

Fig. 5 is a detailed section on the line 5—5 of Fig. 2.

The corresponding parts are referred to both in the drawings and in the specification by similar reference characters.

Figure 1:
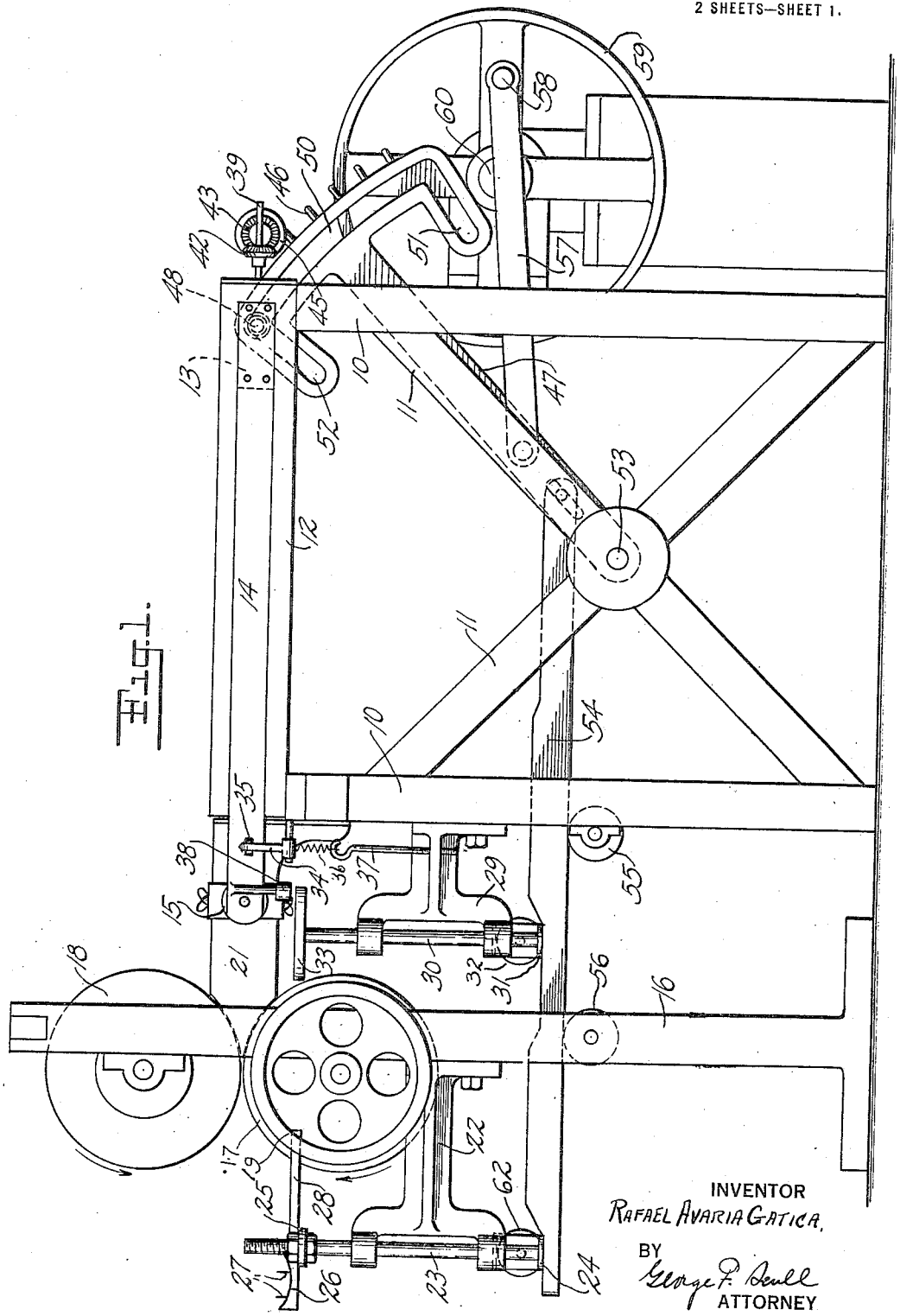

On the frame 10 having cross braces 11 is mounted a pair of slideways 12 in which is a pair of sliding blocks 13. The machine is double and it will therefore be necessary, as to some of the details, to describe only one-half of the machine.

To either side of each of the blocks 13 is fastened a spring arm 14 at the end of which is fastened a fruit holder 15. This fruit holder may be given any suitable cup shape on its interior face in accordance with the kind of fruit to be handled.

On a frame 16 are mounted two sets of slitting knives, each set comprising the knives 17, 18, which are rotated by belts on the pulleys 19, 20, this rotation being in the direction of the arrows, as shown in Fig. 1. These knives will usually have a sharp cutting edge, but they may, if desired, be given a saw-tooth edge.

Fastened to the frame 10 and arranged so that its point comes between the slitting knives 17, 18, is a diamond pointed fixed knife 21. This knife is made very sharp and pointed on the end, but may be widened out to any desired thickness toward its point of support. On the frame 16 is mounted a pair of brackets 22 in which is mounted a vertical, slidable frame comprising the rods 23, and the cross bars 24 and 25. On the cross bar 25 and in alinement with the slitting knives 17, 18, is fastened a fruit support 26, preferably provided with a pair of short pins 27. Also mounted on the cross bar 25 are cams 28 for a purpose to be hereinafter described.

On the frame 10 is mounted a pair of brackets 29 supporting a vertical movable frame comprising the rods 30 and the cross bar 31 having the roller 32. To the top of the rods 30 are fastened the cams 33 for a purpose to be hereinafter described.

Pivoted on the frame 10 are bell crank levers 34 provided each on one of its arms with a roller 35 held against the spring arms 14 by a spring 36, the tension of which is adjustable through the threaded hook 37 passing through the bracket 29.

Attached to each of the spring arms 14 is a roller 38 arranged to engage the cams 33 and 28 in a manner hereinafter to be described.

Supported in the slideway 12 and extending through an opening in the diamond-pointed knife 21, is a shaft 39 on the end of which is a semi-circular knife 40 lying in an opening 41 in the knife 21. The end of the shaft 39 is provided with a gear 42 meshing with a gear 43 on a shaft 44, this shaft being provided with a lantern wheel 45 adapted to be engaged by the pin 46 on the end of a sector 47. The lantern wheel 45 is loosely mounted on the shaft 44 but connected thereto by a ratchet 65 and a pawl 66 in the well known manner so that, as the lantern wheel 45 rotates in one direction, it will drive the shaft 44 but will not drive it when rotated in the opposite direction.

The slide blocks 13 are connected by a fixed shaft 48 carrying a flanged roller 49. The roller 49 extends through an arcuate slot 50 in the sector 47, this slot 50 terminating in the more or less radial slots 51 and 52, as shown in Fig. 1. The sector 47 is pivoted on the shaft 53 mounted in the cross braces 11 of the frame 10.

A cam 54 is supported on the rollers 55 and 56 supported respectively on the frames 10 and 16, this bar being connected by a pin and slot connection to the sector 47.

Motion is given to the sector 47 by the pitman 57 connected to the crank pin 58 on the wheel 59, the wheel 59 being mounted on the shaft 60, turned by the belt pulley 61.

The operation of my illustrative machine is as follows: Rotation of the shaft 60 will oscillate the sector 47 back and forth. Since the shaft 48 is moving in the arcuate slot 50, the first motion of the sector will not affect the slides 13. The pins 46, however, will engage the lantern wheel 45 and thereby rotate the shafts 39 and the knives 40 therewith. The number of teeth 46 are such that the knives 40 will make one complete turn before the rear of the slot 51 in the sector 47 engages the roller 49. When this engagement takes place, the teeth 46 will have run out of engagement with the lantern wheel 45 and the shaft 39 will therefore be at rest. It can be held in this position by any suitable spring detent arrangement.

When the roller 49 is engaged by the rear slot 51 of the sector 47, the arms 14 are moved forward and with them the fruit holders 15. These fruit holders pass the knives and come to rest opposite the fruit supports 26. The fruit to be divided has been placed on the pins 27 and the cam bar 54 causing the rods 23 to rise, carries the fruit support 26 upwardly so that the approximate center of the fruit is opposite the center of the fruit holders 15. But the first motion of the sector 47 has carried the high part of the cam bar 54 under the roller 62 on the bar 24 and thereby caused the cam 28 to rise sufficiently to lie in the path of the rollers 38. The cams 28 are so designed as to cause the spring arms 14 to be spread apart so that the fruit holders 15 are held open until the rollers 38 pass the ends of the cam 28 when the spring arms 14 close, carrying the fruit holders 15 into yielding contact with the fruit on the fruit support 26.

The return motion of the sector 47 is now ready to begin but again the roller 49 is in the arcuate slot 50 so that the first portion of the return motion of the sector 47 leaves the fruit holders 15 stationary. But the first part of the return motion of the sector 47 carries the cam bar 54 backward and this permits the fruit support 26 and the cam 28 to drop, thus pulling the pins 27 out of the fruit and leaving the fruit free to be moved to the right of Fig. 1. When the rear wall of the slot 52 of the sector 47 contacts with the roller 49, the fruit holders 15 are carried to the right of Fig. 1, thus carrying the fruit between the slitting knives 17, 18 by which it is divided. Simultaneously it is pressed against the sharp point of the diamond-shaped knife 21 and the two halves of the fruit are slid along the surface of the knife 21 until the center of the fruit comes opposite the opening 41 in the knife. This position is reached when the sector 47 has completed its motion to the right of Fig. 1.

As the sector again swings to the left of Fig. 1, the fruit holders 15 will remain stationary while the teeth 46 again engage the lantern wheel 45 and rotate the knives 40. Since the center of the core or pit is opposite the center of this knife, it will be evident that the core or pit will be completely cut out by the knife 40 and the latter will again come to rest in a position inside of the diamond-pointed knife 21. This motion has also again moved the cam bar 54 to the left of Fig. 1 and thus caused the cam 33 to rise into the path of the roller 38. As the spring arms 14 are again moved forward, the rollers 38 cause the spring arms to open slightly so that any portion of the core remaining in the opening 41 will not injure the two halves of the fruit as the latter are returned to the left of Fig. 1.

The cam 33 is so shaped that the spring arms 14 can hold the two halves of the fruit yieldingly against the sides of the knife 21 and prevent its falling out of the holders 15 until the cams 28 are again reached when the holders 15 are opened sufficiently to permit the fruit to drop into any convenient receptacle. Continued motion of the frames 15 will cause them to close on the next fruit to be slit which has been placed on the fruit support 26.

The rollers 35 held by the springs 36 are provided to give additional yielding tension on the holders 15 at the time when the coring knife 40 is in operation to prevent displacement of the fruit.

If desired, the knife 40 may be provided with a little flange to prevent the knife from cutting into the hard kernel, this being a well known arrangement and need not be further described. For some purposes it may be desired to change the knife 40 which may be done by unscrewing it from the shaft 39. The blocks 67 and 68 on the knife 21 may be moved so as to alter the size of the opening 41 if desired.

On the spring arms 14 are mounted a pair of yielding punches 70 which are arranged to slide past the opening 40 and remove any portion of the core which might remain inside of the opening.

When dividing fruit like peaches or apricots, it will be understood that the crease in the fruit is placed uppermost, so that the pit will be divided along its natural line of division. In other fruits the position is immaterial so long as the fruit is placed lengthwise in the supports 26.

It will be understood that the specific mechanism for carrying out my invention may be varied within very wide limits, and I do not wish to be confined to the specific devices which I have disclosed. An important feature, however, which greatly simplifies the device is the slotted sector 47 by means of which I obtain the necessary dwells for the fruit holders 15 at the time the fruit is taken and also at the time when the coring operation is going on without any complicated cam arrangement. By means of this slotted sector, I am able to give all of the desired motion to the machine by substantially one element.

What I claim is:

1. In a machine of the class described, a pair of rotary knives, means, including a pair of flexible arms, to carry the fruit past said knives, a fixed knife to enter the cut made by the rotary knives and separate the fruit and a rotary coring knife arranged to cut out the core of the fruit after it has been divided and while it is held by said flexible arms.

2. In a machine of the class described, a pair of rotary knives, a pair of fruit holders, yieldingly held toward each other, means to move said fruit holders back and forth past said rotary knives, a fixed knife adjacent said rotary knives and in alinement therewith and a rotatable blade normally located within an opening in said fixed knife and means to rotate said blade when said fruit holders are opposite it.

3. In a machine of the class described, a pair of rotary knives, a slidable member mounted to move toward and away from said rotary knives, a pair of flexible arms mounted on said slidable member, fruit holders attached to the ends of said flexible arms, a fixed knife adjacent said rotary knives and in alinement therewith, a fruit support located in alinement with said rotary knives and on the side thereof opposite said fixed knife, a rotatable blade normally located in alinement with said fixed knife and in an opening therein, and means to move said slidable member to carry said fruit holders back and forth between said fruit support and said rotatable blade, said last named means causing said fruit holders to dwell when opposite said rotatable blade and means to rotate said rotatable blade during the dwell.

4. In a machine of the class described, a pair of flexibly mounted fruit holders, a slidable member to which said fruit holders are attached, a fixed knife having an opening therein, a rotatable blade in said opening and a sector having a pair of non-arcuate slots at the end of an arcuate slot, a member projecting from said slidable member into said slots, means to oscillate said sector and gearing between said sector and said rotatable blade, constructed and arranged to cause said blade to make one complete rotation as the sector is moving in one direction and to prevent the rotation of the blade when the sector is moving in the opposite direction.

5. In a machine of the class described, a pair of fruit holders yieldingly held toward each other, and cam rollers connected to each of said fruit holders, a cam arranged to engage the said cam rollers to cause the fruit holders to separate, means to move the fruit holders back and forth, a fruit support connected with said cam, means to move said cam into and out of the path of said cam roller, said cam and the means for moving it into and out of the path of the cam roller being constructed and arranged to cause the fruit holders to open and then close on fruit held on said fruit support while the fruit holder is moving in one direction and to move said cam out of the path of said cam roller as the fruit holders move in the opposite direction.

6. In a machine of the class described, a fixed knife having an opening therein, a rotatable blade normally positioned in said opening, a pair of yieldingly mounted fruit holders movable back and forth along said fixed knife, means to rotate said rotatable blade while the said fruit holders are opposite said blade, and means to move said fruit holders apart as they are moved away from said rotatable blade.

7. In a machine of the class described, a fixed knife having an opening therein, a rotatable blade normally positioned in said opening, a pair of yieldingly mounted fruit holders movable back and forth along said fixed knife, means to rotate said rotatable blade while the said fruit holders are opposite said blade, means to increase the pressure between said fruit holders while said rotatable blade is rotating, and means to move said fruit holders apart as they are moved away from said rotatable blade.

8. In a machine of the class described, a fixed knife having an opening therein, a rotatable blade normally positioned in said opening, a pair of yieldingly mounted fruit holders movable back and forth along said fixed knife, means to rotate said rotatable blade while the said fruit holders are opposite said blade, means to increase the pressure between said fruit holders while said rotatable blade is rotating, means to move said fruit holders apart as they are moved away from said rotatable blade, and devices movable with said fruit holders and arranged to eject material left in said opening after said fruit holders have passed it.

RAFAEL AVARIA GATICA